United States Patent Office 3,579,635
Patented May 18, 1971

---

3,579,635
ANTIBIOTIC TREATMENT OF RUMINANT ANIMALS WITH BIS-UREA ADDUCTS OF ALDEHYDE-CONTAINING MACROLIDE ANTIBIOTICS
Arthur P. Raun, New Palestine, and Richard M. Kline, Indianapolis, Ind., assignors to Eli Lilly and Company, Indianapolis, Ind.
No Drawing. Continuation-in-part of application Ser. No. 744,627, July 15, 1968, which is a continuation-in-part of application Ser. No. 687,499, Dec. 4, 1967. This application Oct. 8, 1969, Ser. No. 864,892
Int. Cl. A61k 21/00
U.S. Cl. 424—181
2 Claims

ABSTRACT OF THE DISCLOSURE

Ruminants are treated for therapeutic or growth-promoting purposes with novel bis-urea adducts of aldehyde-containing macrolide antibiotics which derivatives are antibiotically inactive though substantially chemically stable in the rumen, but which are unstable in the abomasum wherein they are converted to a macrolide antibiotic.

CROSS-REFERENCE

This application is a continuation-in-part of our copending application Ser. No. 744,627 filed July 15, 1968 now abandoned which was in turn a continuation-in-part of our then copending application Ser. No. 687,499, filed Dec. 4, 1967, now abandoned.

BACKGROUND OF THE INVENTION

Oral administration of antibiotics, including the macrolides and the tetracyclines, to ruminant animals either for therapeutic purposes or to increase feed efficiency or weight gain is usually accompanied by undesirable side effects. These antibiotics, when administred at rates at which they will be useful for such purposes, deleteriously affect the rumen flora. As a consequence, the digestive mechanism of the ruminant is upset and the animals customarily go off feed, with or without attacks of diarrhea, etc. For example, Bell et al. J. Anim. Sci. 9, 647 (1950) and Proc. Soc. Exptl. Biol. and Med. 76, 284 (1951) have found that administration of chlortetracycline depresses both crude fiber and dry matter digestability in cows. The importance of the rumen in the digestion of fiber (consisting almost entirely of dietary cellulose) can hardly be overemphasized and the depression of the cellulose digestion process slows the animals' growth, milk production, etc. Similar results were obtained by Luther et al. ("European Symposium on Antibiotics and New Growth Factors in Animal Nutrition," Rome, Italy, May 10–12, 1955) for the antibiotics polymixin B, chloramphenicol, bacitracin, dihydrostreptomycin, oxytetracycline, penicillin G and carbomycin. Finally, in certain in vitro tests, Hungate et al., J. Anim. Sci. 14, 997 (1955) found that the presence of high levels of chlortetracycline reduced the total fermentation products with a typical rumen flora.

In addition to the above studies, it is well recognized that there is frequently a period of anorexia, with or without diarrhea, in the initial stages of the oral antibiotic treatment of mature ruminants. These undesirable side effects have also been found when the macrolide antibiotics, including tylosin, are administered to ruminants.

It is apparent from the above consideration that an improved method of administering any antibiotics to ruminants via the oral route would be most desirable.

SUMMARY OF THE INVENTION

This invention provides a method for administering macrolide antibiotics to ruminants by the oral route in which the macrolide antibiotic is administered in the form of a bis-urea derivative which is both substantially stable to chemical degradation in the rumen and also antibiotically inactive therein, but which derivative, upon passing into the abomasum, is converted into a macrolide antibiotic which is able to achieve its full therapeutic or growth-promoting effect without disturbing the microflora of the rumen. These bis-urea derivatives have the following structure:

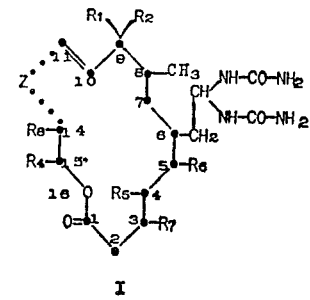

I wherein:

Z is

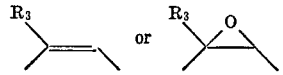

$R_1$ when taken singly is hydrogen;
$R_2$ when taken singly is —O-forosamine;
$R_1$ and $R_2$ when taken together with the carbon to which they are attached form a keto group;
$R_3$ is hydrogen or methyl;
$R_4$ is methyl or ethyl;
$R_5$ is methyl or methoxy;
one of $R_6$ and $R_7$ is O-mycaminose-O-mycarose, O-mycaminose, or O-mycaminose-O-isovaleryl mycarose; and,
The other of $R_6$ and $R_7$ is hydroxy, acetoxy, or propionoxy; and,
$R_8$ is hydrogen, $CH_2$-O-mycinose, $CH_2$-O-desmethyl mycinose, methyl, or hydroxymethyl.

The sugars or amino sugars—mycarose, mycaminose, mycinose and forosamine—are disclosed in Kirk-Othmer: Encyclopedia of Chemical Technology, vol. 12, Second edition, p. 639, John Wiley and Sons, Inc. The radicals derived from these sugars, as referred to above in defining $R_2$ $R_6$, $R_7$ and $R_8$, have the following structures with the free bond indicating the point of attachment either to the macrolide ring or to another sugar, as in the case of O-mycaminose-O-mycarose.

O-mycarose

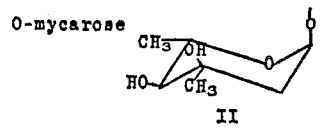

II

O-mycinose

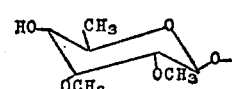

III

O-mycaminose

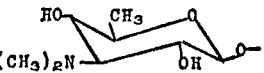

IV

O-forosamine

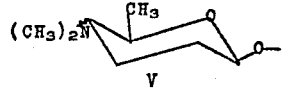

V

The term "O-mycaminose-O-mycarose" used in the above formula indicates that a mycarose molecule is substituted into mycaminose through an oxygen bridge.

Desmethyl mycinose, referred to in defining $R_8$, has the following structure:

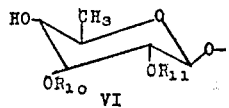

wherein one of $R_{10}$ and $R_{11}$ is hydrogen and the other is methyl.

O-isovaleryl mycarose, referred to in defining $R_6$ and $R_7$ has the following structure:

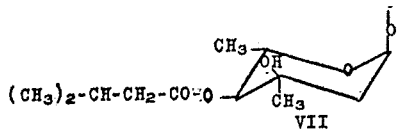

Compounds represented by the above Formula I are formed by the reaction of two moles of urea and an aldehyde-containing macrolide antibiotic represented by the formula:

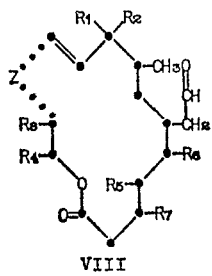

Macrolide antibiotics having the above structural characteristics are listed in the following table with the particular substituent groups for the particular antibiotic listed under the corresponding R or Z symbol.

As can be seen from the table below, the antibiotics environment of the aldehyde group is substantially identical in each of the listed antibiotics, with the chief difference being the sugar attached at $C_5$ (or $C_3$). It is well within the skill of the art to form bis-urea adducts of other macrolide-substituted acetaldehydes having slightly different groups attached at different points of the macrolide ring or having structurally different sugars attached thereto. As can be seen from the above formula, the macrolide-substituted acetaldehyde antibiotic form a family, which is constantly being augmented by isolation of new antibiotics from fermentations or by the recognition that previously isolated antibiotics contained an aldehyde group.

The bis-urea adducts represented by Formula I above, and in particular tylosin bis-urea adduct, are useful in treating ruminants for infections caused by gram-positive organisms, CRD-related diseases, etc. or for increasing weight gains or feed efficiency or both. These bis-urea adducts of the aldehyde-containing macrolide antibiotics are virtually inactive antibiotically and do not affect the growth or metabolism of important rumen microflora. In addition, they are chemically stable, being resistant to hydrolysis at the substantially neutral pH of the rumen. However, when these bis-urea adducts pass into the acidic abomasum, they are chemically unstable at pH's encountered there and are rapidly hydrolyzed to yield the original antibiotic, or in some cases, a mixture of the original antibiotic plus an antibiotically active, acid degradation product of the original antibiotic. In other words, our novel process makes the oral administration of macrolide antibiotics to ruminants similar to the oral administration of antibiotics to non-ruminant animals, in which latter case, the active antibiotic immediately passes into the stomach which has an acidic pH and from which it can be absorbed, either as such or as an antibiotic acid degradation product.

Thus, according to our novel process, an aldehyde-containing macrolide antibiotic can be administered to a ruminant by the oral route without disturbing the microflora of its rumen and consequently without causing intestinal upset, anorexia and diarrhea, or any of these, since

TABLE 1

| | Z | $R_1$ and $R_2$ | $R_3$ | $R_4$ | $R_5$ | $R_6$ and $R_7$ | $R_8$ |
|---|---|---|---|---|---|---|---|
| Tylosin group: | | | | | | | |
| Tylosin | ⟨R_3⟩ | Keto | $CH_3$ | $C_2H_5$ | $CH_3$ | —O—mycaminose—O—mycarose; H | —$CH_2$—O—mycinose. |
| Desomycosin | Same | do | $CH_3$ | $C_2H_5$ | $CH_3$ | —O—mycaminose; H | Do. |
| Macrocin | do | do | $CH_3$ | $C_2H_5$ | $CH_3$ | —O—mycaminose—O—mycarose; H | —$CH_2$—O—desmethyl mycinose. |
| Lactenocin | do | do | $CH_3$ | $C_2H_5$ | $CH_3$ | —O—mycaminose; H | Do. |
| ONT | do | do | $CH_3$ | $C_2H_5$ | $CH_3$ | do | —$CH_2OH$ |
| Cirramycin | ⟨O⟩ | do | $CH_3$ | $C_2H_5$ | $CH_3$ | do | $CH_3$ |
| Spiramycin group: | | | | | | | |
| Spiramycin I | | —H, —O—forosamine | H | $CH_3$ | $CH_3O$ | —O—mycaminose—O—mycarose; —OH | H |
| Spiramycin II | Same | Same as above | H | $CH_3$ | $CH_3O$ | —O—mycaminose—O—mycarose; —O—CO—$CH_3$. | H |
| Spiramycin III | do | do | H | $CH_3$ | $CH_3O$ | —O—mycaminose—O—mycarose; —O—CO—$C_2H_5$. | H |
| Leucomycin $A_1$ | do | do | H | $CH_3$ | $CH_3O$ | —O—mycaminose—O—isovaleryl mycarose; —OH. | H |
| Leucomycin $A_3$ | do | do | H | $CH_3$ | $CH_3O$ | —O—mycaminose—O—isovaleryl mycarose; —O—CO—$CH_3$. | H |
| Carbomycin group: | | | | | | | |
| Carbomycin B | ⟨R_3⟩ | Keto | H | $CH_3$ | $CH_3O$ | do | H |
| Niddamycin | Same | do | H | $CH_3$ | $CH_3O$ | —O—mycaminose—O—isovaleryl mycarose; —OH. | H |
| Carbomycin A | ⟨O, R_3⟩ | do | H | $CH_3$ | $CH_3O$ | —O—mycaminose—O—isovaleryl mycarose; —O—CO—$CH_3$. | H | included within the scope of Formula VIII are all substituted acetaldehydes in which the substituting group is a 16-member macrolide ring. Furthermore, the immediate it is probably the antibiotic-induced alteration of the microfloral balance in the rumen which predisposes to those various undesirable side effects accompanying antibiotic administration to ruminants, since the particular microflora whose populations are altered invariably include the cellulose digesting organisms. By our invention, the full therapeutic and/or growth-promoting or feed efficiency effects of the macrolide antibiotics are achieved without any of the commonly occurring undesirable side effects.

Specifically, using the bis-urea adduct of tylosin as an example of the urea adducts of aldehydre-containing macrolides, when the compound is administered to cows at the rate of 250 mg./cow/day, there is little, if any, initial feed intake depression, such as occurs when tylosin alone is administered, nor is there any appreciable effect upon cellulose digestion nor upon non-protein nitrogen utilization. Furthermore, there is neither diarrhea nor loss of appetite.

In carrying out the process of this invention, again using tylosin as an example of an aldehyde-containing macrolide antibiotic, tylosin-bis-urea adduct is fed to cows, sheep or goats at the rate of from 1 to 1000 mg./animal/day depending on whether a rapid therapeutic effect is desired or whether the antibiotic is simply being fed to the animal either to increase weight gains and general health or to increase feed efficiency or both as a part of an over-all feeding program. The ruminant animals to whom these levels of tylosin-bis-urea adducts are fed exhibit all the favorable results to be expected from administration of the antibiotic but without any of the side effects ordinarily associated with the administration of tylosin by itself.

In administering tylosin-bis-urea adduct or other macrolide bis-urea adducts or other base-stable anibiotic derivatives to ruminant animals, the compounds are mixed with the feed as such. They can also be coated with gelatin or other similar material and then mixed with the feed. Finally, they can be administered in bolus form as is customary with administration of therapeutic doses of antibiotic to beef animals.

The following table indicates the lack of effect of tylosin-bis-urea adduct, a typical base-stable, antibiotically inactive form of an aldehyde-containing macrolide antibiotic, upon the cellulose digestive organisms in the rumen. In this demonstration, a rumen inoculum was prepared from rumen liquor collected from a fistulated steer maintained on a high roughage ration. In preparing this inoculum, the rumen contents were strained through 4 layers of cheesecloth; the residue remaining in the cheesecloth was resuspended in an equal volume of phosphate-carbonate buffer at 37° C., and was again strained through the cheesecloth. The resulting rumen liquor was allowed to settle for about 30 minutes, during which time the protozoa settled to the bottom while small amounts of particulate matter rose to the surface. The protozoa and liquid phase were separated and used as the rumen inoculum. Prior to use, the inoculum was diluted with an equal volume of a phophate-bicarbonate buffer (previously saturated with carbon dioxide) having the following ingredients:

Composition of nutrient buffer mixture

| Ingredient: | Gm./liter |
|---|---|
| $NaH_2PO_4$ | .316 |
| $KH_2PO_4$ | .152 |
| $NaHCO_3$ | 2.260 |
| $KCl$ | .375 |
| $NaCl$ | .375 |
| $MgSO_4$ | .112 |
| $CuCl_2$ | .038 |
| $FeSO_4$ | .008 |
| $MnSO_4$ | .004 |
| $ZnSO_4$ | .004 |
| $CuSO_4$ | .002 |
| $CoCl_2$ | .001 |

Cellulose at the rate of 5 g./liter and urea at the rate of 1 g./liter were added to the diluted inoculum. The mixture was incubated under a carbon dioxide atmosphere for 30 minutes. Twenty-five milliliter aliquots were then removed and placed in small incubation flasks equipped with one-way gas valves to allow for excess gas escape and for maintenance of anaerobic conditions. Various antibiotic materials at various levels were added to the incubation flask, and the incubation carried out for 24 hours. At the end of the incubation, the pH was recorded. Five milliliters of 20 percent metaphosphoric acid were then added to each flask. The contents of the flasks were frozen, then thawed and centrifuged. A sample of the supernatant was recovered to determine short chain volatile fatty acids by gas chromatography. The remaining contents of the flask were mixed with 20 ml. of 80 percent acetic acid and 2 ml. of nitric acid, and the mixture heated at 130° C. for 30 minutes in order to digest all material except cellulose. After the heating period, 20 ml. of ethyl alcohol were added to the contents of each flask and the insoluble material, predominantly cellulose, centrifuged. Tylosin, chlortetracycline and oxytetracycline were added to the flasks at a concentration of 1 mcg./ml. Tylosin-bis-urea adduct was added to the flask at a level which would provide 1 microgram of tylosin/ml. after hydrolysis of the adduct. One flask was kept as a control. Table 2 below gives the results of this experiment. In the table, column 1 gives the treatment and column 2 the average percent cellulose digested (3 incubations).

TABLE 2

| Treatment: | Average percent cellulose digested |
|---|---|
| Tylosin-bis-urea adduct | 69.6 |
| Tylosin | 30.3 |
| Chlortetracycline | 12.9 |
| Oxytetracycline | 16.8 |
| Control | 76.3 |

A similar experiment involving the effect of other aldehyde-containing macrolides and their bis-urea adducts on cellulose digestion was carried out and the results listed in Table 3 below. In the table, column 1 gives the name of the antibiotic or its bis-urea adduct, column 2, the percent of cellulose digested at an antibiotic (or antibiotic equivalent in the case of the adduct) level of 0.5 mcg./ml. and column 3, the same information for a 0.1 mcg./ml. antibiotic level.

TABLE 3

| Name: | 0.5 mcg./ml. | 0.1 mcg./ml. |
|---|---|---|
| Carbomycin | 11.8 | 11.9 |
| Carbomycin bis-urea adduct | 30.8 | 30.8 |
| Spiramycin | 4.4 | 7.8 |
| Spiramycin bis-urea adduct | 23.5 | 15.6 |
| Macrocin | 0 | 0.6 |
| Macrocin bis-urea adduct | 32.0 | 15.6 |
| Control | 26.3 | 26.3 |

Table 4 gives the effect of the antibiotics from Table 2 upon volatile fatty acid production. In Table 4, column 1 gives the treatment and column 2 the average number of millimoles/ml. of volatile fatty acids.

TABLE 4

| Treatment: | Average volatile fatty acids produced, $\mu$m./ml. |
|---|---|
| Tylosin-bis-urea adduct | 27.0 |
| Tylosin | 8.6 |
| Chlortetracycline | 3.4 |
| Oxytetracycline | 2.0 |
| Control | 29.2 |

It can be seen from the results of the above experiments that tylosin-bis-urea adduct has little or no effect upon the percent cellulose digested or upon the volatile fatty acid production by rumen flora, whereas the other antibiotics, including tylosin alone, have a deleterious effect upon both of these rumen activities.

This bis-urea adducts of aldehyde-containing macrolides are stable in rumen fluid for prolonged periods of time. In making this determination 10 ml. aliquots of a rumen inoculum prepared as indicated above, were used. The antibiotic or its bis-urea adduct were added at a 12 mcg./ml. level, either as such or as the amount of antibiotic present in the bis-urea adduct. The samples were incubated for 17 or 24 hours, frozen and then thawed and their antibiotic level determined by standard assay procedures. The bis-urea adduct samples were then hydrolyzed and the antibiotic level of the hydrolyzate also determined. Table 5, which follows, gives the result of this experiment. In the table, column 1 gives the name of the antibiotic, column 2 the time interval for incubation, column 3 the antibiotic level, and column 4 the antibiotic level after hydrolysis.

TABLE 5

| Name: | Length of incubation in hours | Antibiotic assay (mcg./ml.) | Antibiotic assay after hydrolysis (mcg./ml.) |
| --- | --- | --- | --- |
| Carbomycin | 0 | 9.0 | 7.8 |
|  | 24 | 5.9 | 10.0 |
| Carbomycin bis-urea adduct | 0 | 0.73 | 9.7 |
|  | 24 | 0.92 | 7.8 |
| Spiramycin | 0 | 11.5 | 19.0 |
|  | 24 | 11.5 | 19.0 |
| Spiramycin bis-urea adduct | 0 | 1.4 | 19.0 |
|  | 24 | 7.2 | 15.0 |
| Macrocin | 0 | 13.3 | 21.3 |
|  | 24 | 9.5 | 17.0 |
| Macrocin bis-urea adduct | 0 | 0.3 | 21.3 |
|  | 24 | 0.8 | 21.8 |
| Tylosin | 0 | 8.3 |  |
|  | 17 | 7.0 | 5.8 |
| Tylosin bis-urea adduct | 0 | <1.0 |  |
|  | 17 | 1.7 | 7.2 |

Tylosin-bis-urea adduct has also proved to be very effective in actual use in the field. The results listed in Table 6 were obtained in a 28-day feeding experiment with yearling steers on a high roughage ration. In the table, column 1 gives the number of steers on each feeding regimen, column 2 daily antibiotic level, if any, per steer, column 3 pounds gained per steer per day, column 4 pounds of feed per steer per day and column 5 pounds of feed per pound of gain.

TABLE 6

| Number steers in each group | Daily antibiotic level in feed | Lbs. gained per steer per day | Lbs. of feed per steer per day | Lbs. of feed/ lbs. of gain |
| --- | --- | --- | --- | --- |
| 11 | None | 1.33 | 20.7 | 15.5 |
| 11 | Tylosin, 250 mg | 1.38 | 21.1 | 15.3 |
| 11 | Tylosin-bis-urea adduct containing 250 mg. tylosin activity. | 1.50 | 21.2 | 14.1 |

As can be seen from the data in the above table, steers receiving tylosin-bis-urea adduct gained more weight per day than either steers receiving an equivalent amount of tylosin or a control group and that the feed efficiency (feed per pounds gained) was also increased. Furthermore, the steers receiving tylosin-bis-urea adduct did not exhibit any of the undesirable side effects discussed above.

Tylosin-bis-urea adduct can be used to treat ruminant animals suffering from various common pathogenic conditions including the following:

abscess of the liver, caused by *Spherophorus necrophorus;*
blackleg, caused by *Clostridium chauvoei;*
enterotoxemia, caused by *Clostridium perfringens;*
malignant edema, caused by *Clostridium septicum;*
tetanus, caused by *Clostridium tetani;* and
pneumonia, probably caused by a complex of virus, mycoplasma and bacteria.

Dosages of tylosin-bis-urea adduct up to 250 mg. per head per day are prophylactic as to all of the above organisms, and in addition, will prevent pneumonia. Higher dosages, up to 2000 mg. per animal per day, may be required to treat pathological disease.

In addition, tylosin-bis-urea adduct can be used to eliminate coccidia from cattle and sheep. These coccidia are parasites which occupy epithelial cells of the intestinal tract in which they first multiply asexually and then undergo sexual reproduction within the host cells. Again, dosages up to 2000 mg. per animal per day may be required to eliminate all signs of the organism and its debilitating effect upon the animal. The most pathogenic coccidia for cattle are *Eimeria bovis* and *E. zurnii,* although *E. cylindrica, E. ellipsoidalis, E. bukidnonensia, E. auburnensis* and *E. alabamensis* may also be pathogenic but to a lesser degree. In sheep, the most pathogenic organisms are *Eimeria ninakohlyakimovae, E. arloingi* and *E. ahsata,* although *E. faurei, E. intracata,* and *E. parva* may also be pathogenic but to a lesser degree.

The preparation of a bis-urea adduct of a specific macrolide antibiotic useful in the processes of this invention is illustrated below.

EXAMPLE 1

Tylosin-bis-urea adduct

One hundred grams of tylosin tartrate are dissolved in a solution containing 100 g. of urea in 100 ml. of water. The resulting mixture is allowed to stand until thin layer chromatography indicates that the formation of the adduct is substantially complete. In carrying out the thin layer chromatography, silica gel is used as the substrate with a 1:9 diethylamine-ethyl acetate solvent system. In this system, the tylosin-bis-urea adduct remains at the origin while tylosin moves closely behind the solvent front.

The tylosin-bis-urea adduct is isolated from the reaction mixture by adding two volumes of water thereto and then adjusting the pH of the solution to about pH=9 with 10 percent aqueous sodium hydroxide. Solid sodium chloride is next added until the crude tylosin-bis-urea adduct precipitates as a yellowish, gummy solid, which solid is separated by filtration. The filter cake is dissolved in chloroform and the chloroform solution washed with water and dried. The chloroform is removed therefrom at reduced pressure to yield tylosin-bis-urea adduct as a pale yellow amorphous solid which is thoroughly dried at reduced pressure to remove as much residual chloroform as possible. The dried solid is then dissolved in dry acetone at the rate of 5 ml. per gram of solid and the resulting solution is cooled. Tylosin-bis-urea adduct crystallizes as white needles which are separated by filtration. M.P.=220–222° C.

*Analysis.*—Calcd. for $C_{47}H_{83}N_5O_{18}$ (percent): C, 56.22; H, 8.39; N, 6.96. Found (percent): C, 56.05; H, 8.32; N, 6.72.

A nuclear magnetic resonance spectrum of the adduct shows no proton attributable to the aldehyde group. The adduct is microbiologically inactive against organisms which are routinely used to assay tylosin.

Tylosin is chemically regenerated from its bis-urea adduct by dissolving the adduct in aqueous solution maintained at a pH in the range 4–7 by means of standard buffers. Some desmycosin, an acidic hydrolysis product of tylosin, is also obtained.

Bis-urea adducts of other macrolide antibiotics, coming within the scope of Formula VIII above, including the spirmaycins, macrocin, desmycosin, lactenocin, carbomycin, carbomycin B, niddamycin, cirramycin and members of the leucomycin series, can be prepared in analogous fashion. These adducts can be administered orally to ruminants for therapeutic purposes or to increase weight gain and/or feed efficiency in a standard ruminant fattening program in the same way that tylosin-bis-urea adduct is. These other bis-urea adducts are also substantially stable at the rumen pH and antibiotically inactive, but on passing into the abomasum, they are hydrolyzed to the original antibiotic which then can act as such. As with tylosin-bis-urea adduct, there are minimal side-effects accompanying their administration. The dosage range is the same as that for tylosin-bis-urea adduct.

It will be apparent to those skilled in the art that other base-stable, antibiotically-inactive derivatives of various antibiotics, already proven useful in fattening cattle and other ruminants, can be prepared, as for example. ion-exchange resin derivatives, base-insoluble, acid-addition salts and the like.

We claim:

1. The method of administering an aldehyde-containing macrolide antibiotic to ruminants without disturbing the rumen microflora therein while obtaining full antibiotic effects thereof, which comprises orally administering an antibiotically effective amount of said antibiotic in the form of a bis-urea derivative having the structure:

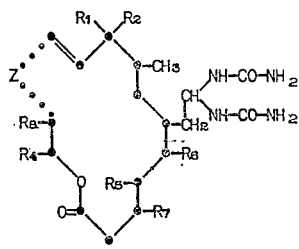

wherein:
Z is

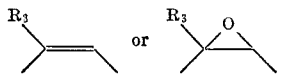

$R_1$ when taken singly is hydrogen;

$R_2$ when taken singly is —O-forosamine;

$R_1$ and $R_2$ when taken together with the carbon to which they are attached form a keto group;

$R_3$ is hydrogen or methyl;

$R_4$ is methyl or ethyl;

$R_5$ is methyl or methoxy;

one of $R_6$ and $R_7$ is O-mycaminose-O-mycarose, O-mycaminose, or O-mycaminose-O-isovaleryl mycarose; and, the other of $R_6$ and $R_7$ is hydroxy, acetoxy, or propionoxy; and, $R_8$ is hydrogen, $CH_2$-O-mycinose, $CH_2$-O-desmethyl mycinose, methyl, or hydroxymethyl.

2. The process according to claim 1 wherein the rumen-stable, antibiotically-inactive substance is tylosin-bis-urea adduct.

References Cited
UNITED STATES PATENTS

| | | | |
|---|---|---|---|
| 2,796,379 | 6/1957 | Tanner et al. | 424—120 |
| 3,178,341 | 4/1965 | Hamill et al. | 424—120 |
| 3,321,368 | 5/1967 | Whaley et al. | 424—120 |
| 3,344,024 | 9/1967 | Whaley et al. | 424—120 |

ALBERT T. MEYERS, Primary Examiner

D. M. STEPHENS, Assistant Examiner